Figure 1:
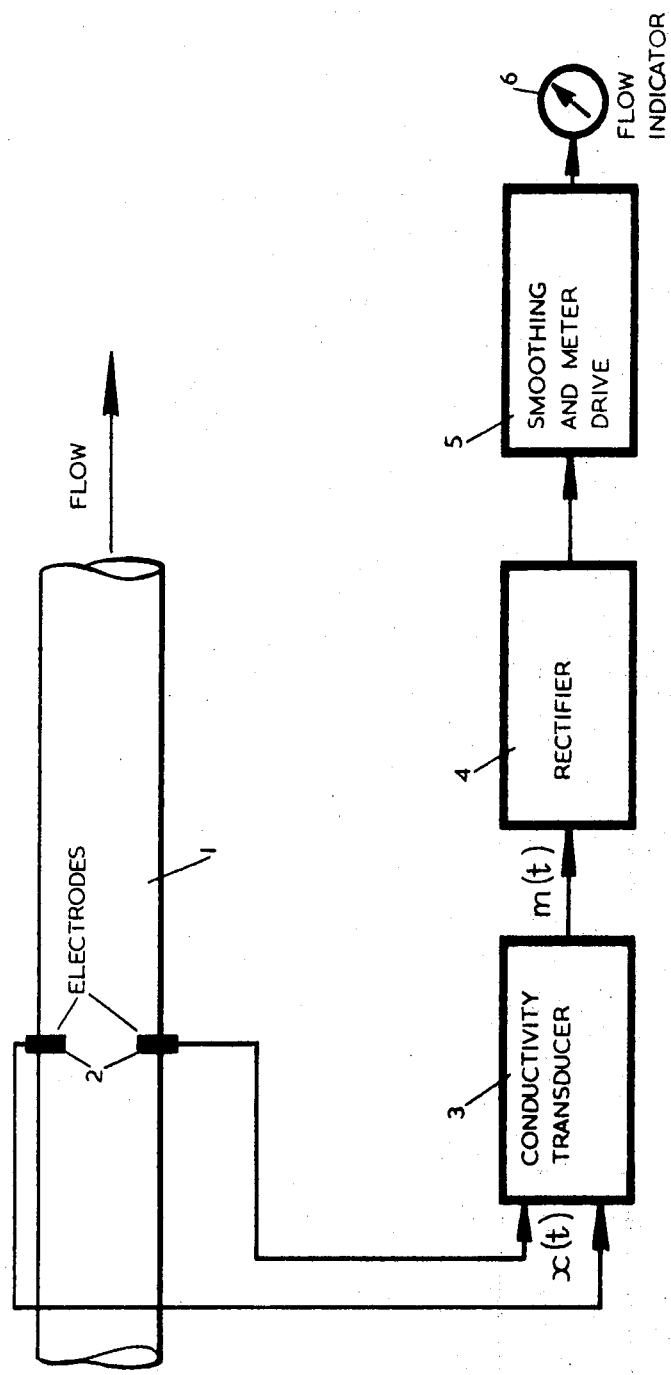

United States Patent
Beck et al.

[11] 3,820,392
[45] June 28, 1974

[54] MEASUREMENT OF FLOW IN A HYDRAULIC SYSTEM

[75] Inventors: Maurice Sidney Beck; George Calvert, both of Ilkley; Patrick John Mendies, Bradford; Malcolm Cunliffe, Haydock, all of England

[73] Assignee: Fielden Electronics Limited, Lancashire, England

[22] Filed: Apr. 17, 1972

[21] Appl. No.: 244,688

[30] Foreign Application Priority Data
Apr. 15, 1971 Great Britain...................... 9550/71

[52] U.S. Cl.............................................. 73/194 E
[51] Int. Cl.............................................. G01f 1/04
[58] Field of Search........... 73/194 E, 194 F, 194 R, 73/53; 324/29, 30 R, 30 B

[56] References Cited
UNITED STATES PATENTS

| | | | |
|---|---|---|---|
| 3,466,927 | 9/1969 | Magrini | 73/194 E |
| 3,595,078 | 7/1971 | Beck et al. | 73/194 F |
| 3,635,082 | 1/1972 | Prellwitz et al. | 73/194 E |
| 3,636,763 | 1/1972 | Beck | 73/194 E |

Primary Examiner—Richard C. Queisser
Assistant Examiner—Stephen A. Kreitman
Attorney, Agent, or Firm—Sughrue, Rothwell, Mion, Zinn & Macpeak

[57] ABSTRACT

A method of on-line measurement of mass flow of the discontinuous phase in a conductive liquid mixture conveying system, comprising the steps of measuring the electrical conductivity between at least one pair of electrodes in contact with the flow stream, deriving a signal representative of the variations of conductivity due to changes in the ratio of the constituents of the mixture or their relative disposition in the conducting path of the electrodes in the stream from the measurement, rectifying the signal, smoothing the signal and displaying or recording the rectified smooth signal in terms of mass flow measurement.

7 Claims, 7 Drawing Figures ized and distributed mixture being delivered to the
MEASUREMENT OF FLOW IN A HYDRAULIC SYSTEM This invention relates to the measurement of flow in a hydraulic system and in particular to the measurement of mass flow of the discontinuous phase and total volume flow of conductive liquids and mixtures including conductive liquids, i.e., liquid solids liquid/liquid and liquid/gas, in a conveying system.

Such liquids and mixtures are conveyed in modern processing and handling plant and it is desirable to be able to measure the mass and/or volumetric flow in such conveyors. Hitherto, if the mixture contained constituents that were hostile to previous measuring systems such as abrasive grits, samples have had to be taken often and analysed off-line to establish either the total flow or the flow of one or more of its constituents.

An object of the present invention is to provide on-line methods and apparatus to measure mass flow and volumetric flow of conductive liquids and mixtures containing mixtures liquids in a conveying system.

According to one aspect of the invention, a method of on-line measurement of mass flow of the discontinuous phase in a conductive-liquid mixture conveying system, comprises the steps of measuring the electrical conductivity between at least one pair of electrodes in contact with the flow stream, deriving a signal representative of the variations of conductivity due to changes in the ratio of the constituents of the mixture or their relative disposition in the conducting path of the electrodes in the stream from the measurement, rectifying the signal, smoothing the signal and displaying or recording the rectified smooth signal in terms of mass flow measurement.

According to another aspect of the invention, apparatus for on-line measurement of mass flow of the discontinuous phase in a conductive-liquid mixture conveying system, comprises a conveying duct, at least one pair of electrodes extending into contact with the liquid mixture in the duct, a conductivity transducer connected to the electrodes to provide a signal related to the measurement of conductivity, means for deriving from the signal an A.C. signal representative of the variation in the conductivity measurement due to changes in the ratio of the constituents of the mixture or their relative disposition in the conducting path of the electrodes in the steam, rectifying and smoothing means for deriving a D.C. signal from the A.C. signal, and means for displaying, recording and/or utilising the D.C. signal as representative of the mass flow rate.

According to another aspect of the invention, a method of on-line measurement of total volume flow in a conductive-liquid mixture conveying system, comprises the steps of sensing the passage of random conductivity disturbances in the flow of the mixture past points of known spacing along a duct of known cross-sectional area, establishing the transit time of the disturbances by cross-correlation, and deriving a measurement of volumetric flow from the transit time.

According to another aspect of the invention, apparatus for on-line measurement of total volume flow in a conductive-liquid mixture conveying system, comprises at least two sensing elements spaced along the line of flow in a duct of known cross-sectional area and adapted to detect small conductivity changes in the mixture flowing past them, means for deriving the transit time between the sensing elements of random disturbances in the flow of mixture by cross-correlation of the outputs of the sensing element using a time delay cross correlator and means for deriving a measurement of volumetric flow from the transit time.

Including the case of a very finely divided evenly sized and distributed mixture being delivered to the conveyor, the concentration of the different elements of the flow will not remain uniform. It has a noise content or disturbance pattern which takes the form of local variations in the concentration of the different elements due to the turbulence of the flowing stream, and this pattern is transmitted through the conveyor at approximately the same velocity as the means of the flow stream.

The variations in concentration arise from the random differential velocity of different elements of the flow according to their position in the turbulence pattern of the flow. This pattern is not immutable but its main characteristics are sufficiently persistent to be recognisable by appropriate techniques at two spatially separated and hence time delayed positions in the flow stream.

The transducer is designed to be sensitive only to changes of conductivity occurring at the rates which result from the passage of a turbulence pattern and to be insensitive and non-responsive to slower changes such as due to change of conductivity of one of the constituents of the flow.

In the method and apparatus so far described, if electrolysis of the mixture is undesirable, the current used to determine the conductivity between the electrodes can be bi-directional having zero algebraic sum and hence there will be no electrolysis. The change of polarity of the current must be made at a higher frequency than the highest frequency of variation of conductivity due to turbulence which is to be measured.

According to another aspect of the invention the method can be used when a single liquid constituent is delivered to the flow conveyor. In this case electrolysis resulting in the formation of gas must be possible and permissible. Electrolysis of the liquid by means of polarising current between a pair of closely spaced electrodes will generate gas bubbles in the liquid which will distribute themselves between the two members of the electrode pair according to the turbulence pattern passing. The effects of surface tensions will introduce backlash into the gathering and release mechanism of the gas and will therefore introduce its own cyclic variation into the mixture of liquid and gas and hence introduce a cyclic variation into the electrical resistance between the electrode pair.

According to this aspect of the invention, apparatus can be provided for on-line measurement of total volume flow in a conductive liquid conveying system. The apparatus comprises at least two pairs of sensing electrodes spaced apart along the line of flow of the liquid in the conveying system, means for providing a polarising current at each pair of sensing electrodes whereby to generate gas bubbles between the members of each pair of electrodes by by electrolysis of the liquid flowing between them, means for detecting variations of conductivity between the members of each pair of electrodes due to varying distribution of the gas bubbles between each member of the pair of electrodes due to turbulence in the liquid flow, means for deriving the transit time of a pattern of conductivity between the pairs of sensing electrodes by cross-correlation of the outputs of the sensing electrodes and means for deriving a measurement of volumetric flow from the transit time. The gas bubbles formed by electrolysis of the liquid distribute themselves between the members of the electrode pair between which they are formed in accordance with the turbulance pattern passing, and their distribution affects the electrical resistance between the electrodes. Accordingly, the passage of a particular disturbance can be detected by the sensed conductivity variation due to the changing distribution of the gas bubbles, and the time taken for a particular disturbance to travel between two pairs of electrodes can be determined by cross-correlating the outputs of the electrodes. The turbulance travels at substantially the same velocity as the liquid, and accordingly the volumetric flow rate of the liquid between the two pairs of electrodes can readily be determined from knowledge of the cross-sectional area of the conduit between the electrode pairs.

According to another aspect of the invention a method of establishing the presence of a flow of any magnitude above a pre-selected magnitude using the output from a single sensing source of variable conductivity due either to the turbulent mixing of different phases of flow or the turbulent mixing of an injected phase of flow, comparing the magnitude of output from a sensing source with a known reference magnitude and operating a two step indicator according to whether the sensing source output is or is not the same or greater magnitude than the reference magnitude.

According to another aspect of the invention apparatus for the comparison of magnitude of the output from a sensing source of conductivity variation due to turbulent flow with a reference magnitude, comprises means to indicate when the magnitude from the sensing source is either equal to or larger than a reference magnitude.

The duct may be conductive and form one of the electrodes of the or each pair.

Figure 2:
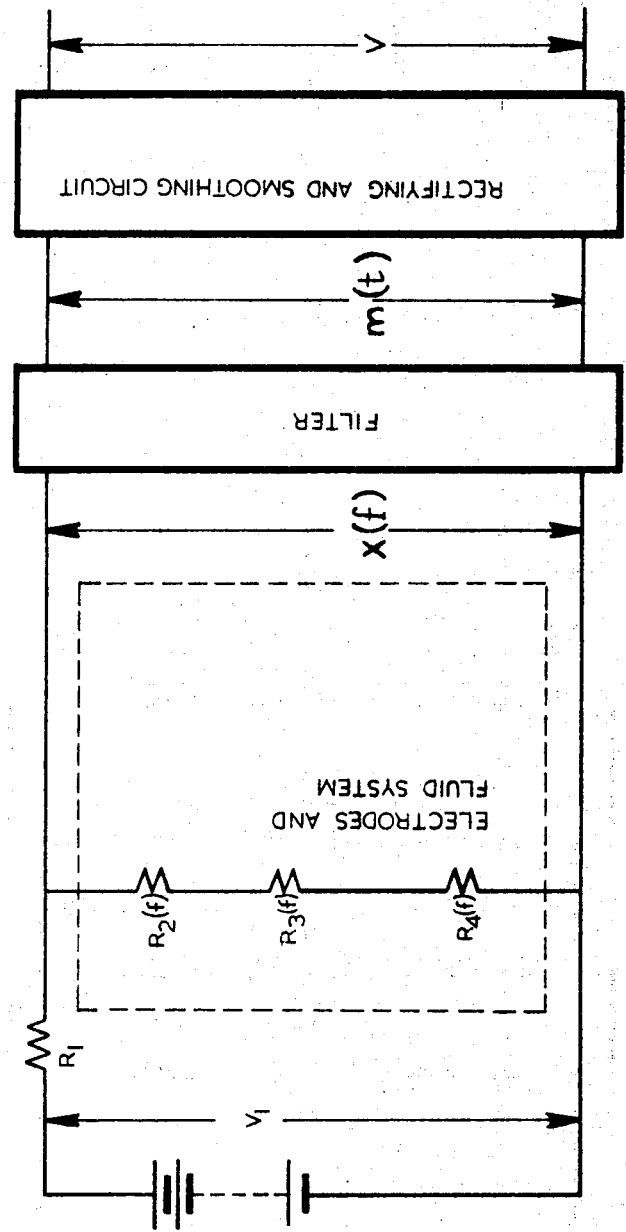
Figure 3:
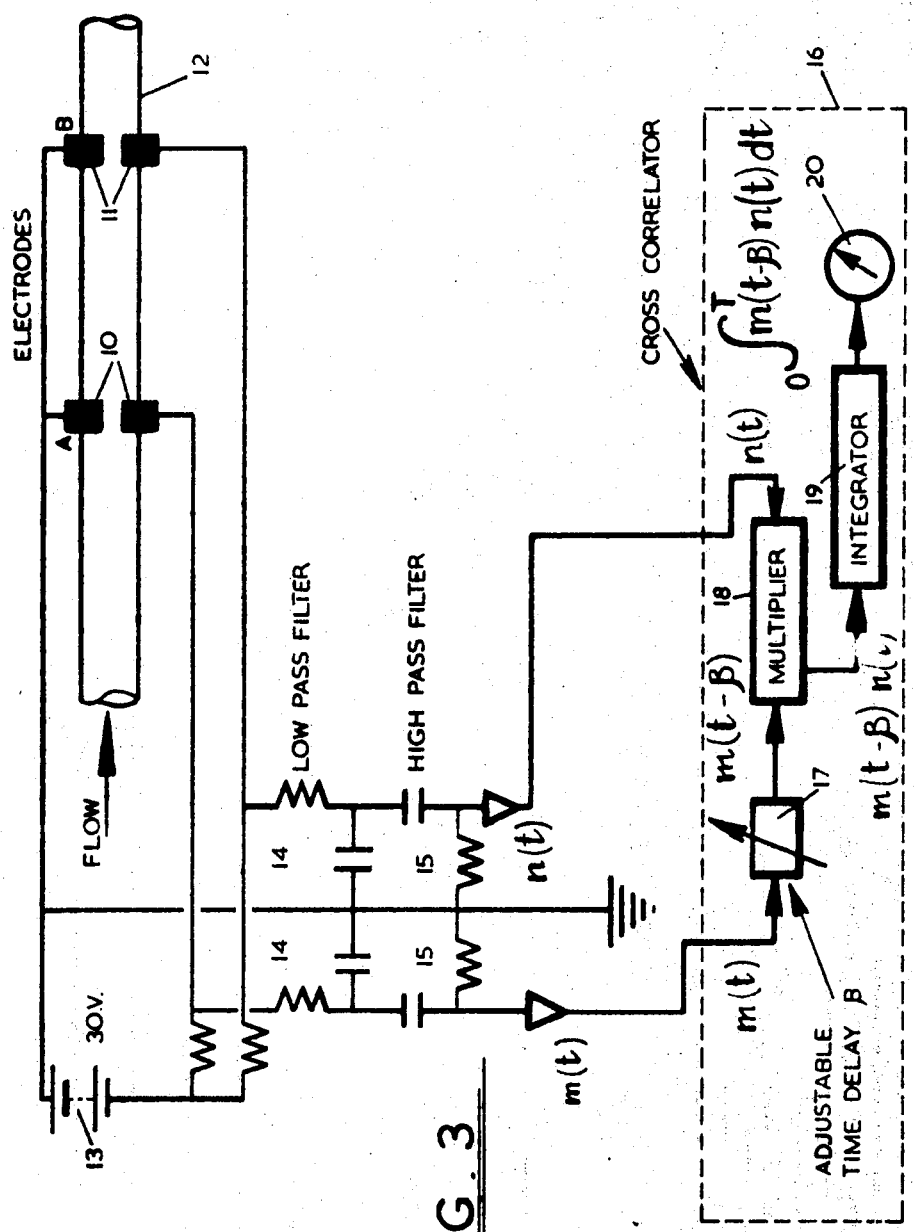
Figure 4:
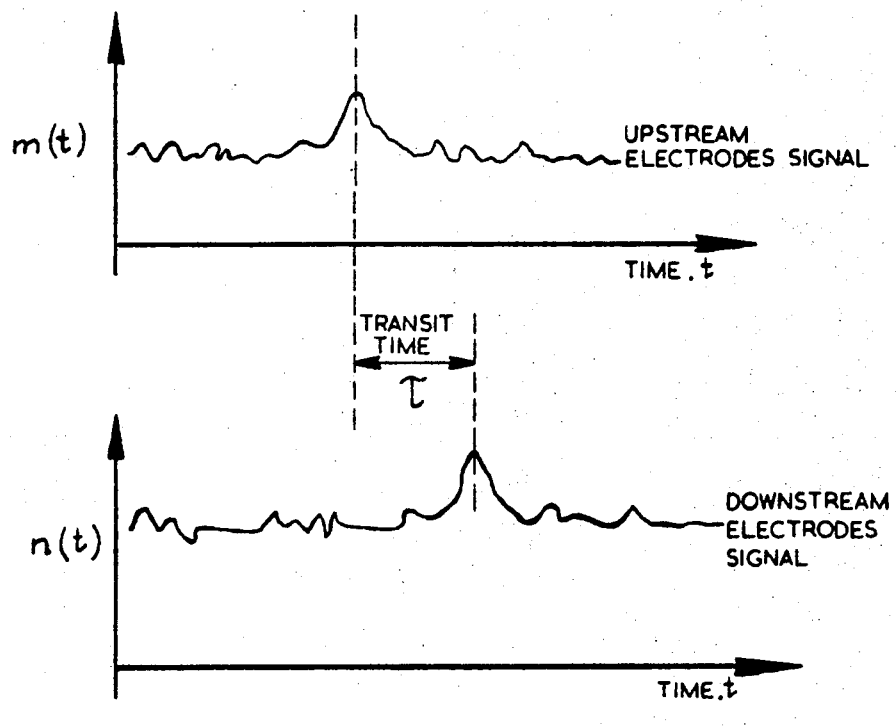
Figure 5:
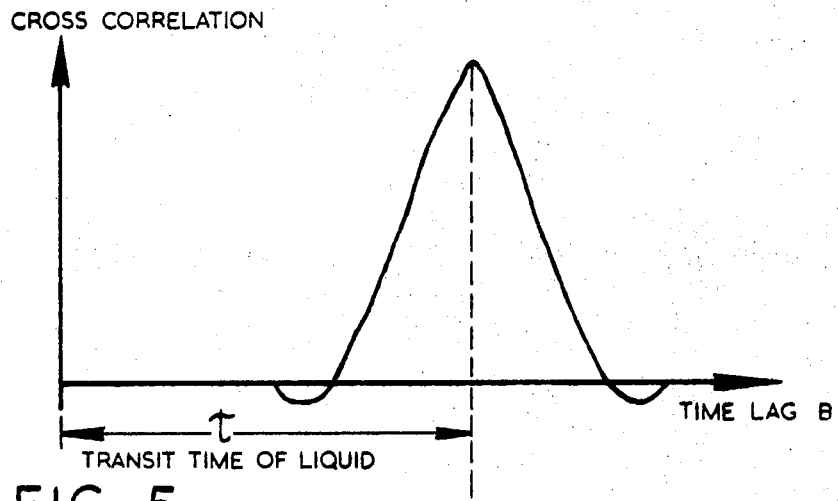
Figure 6:
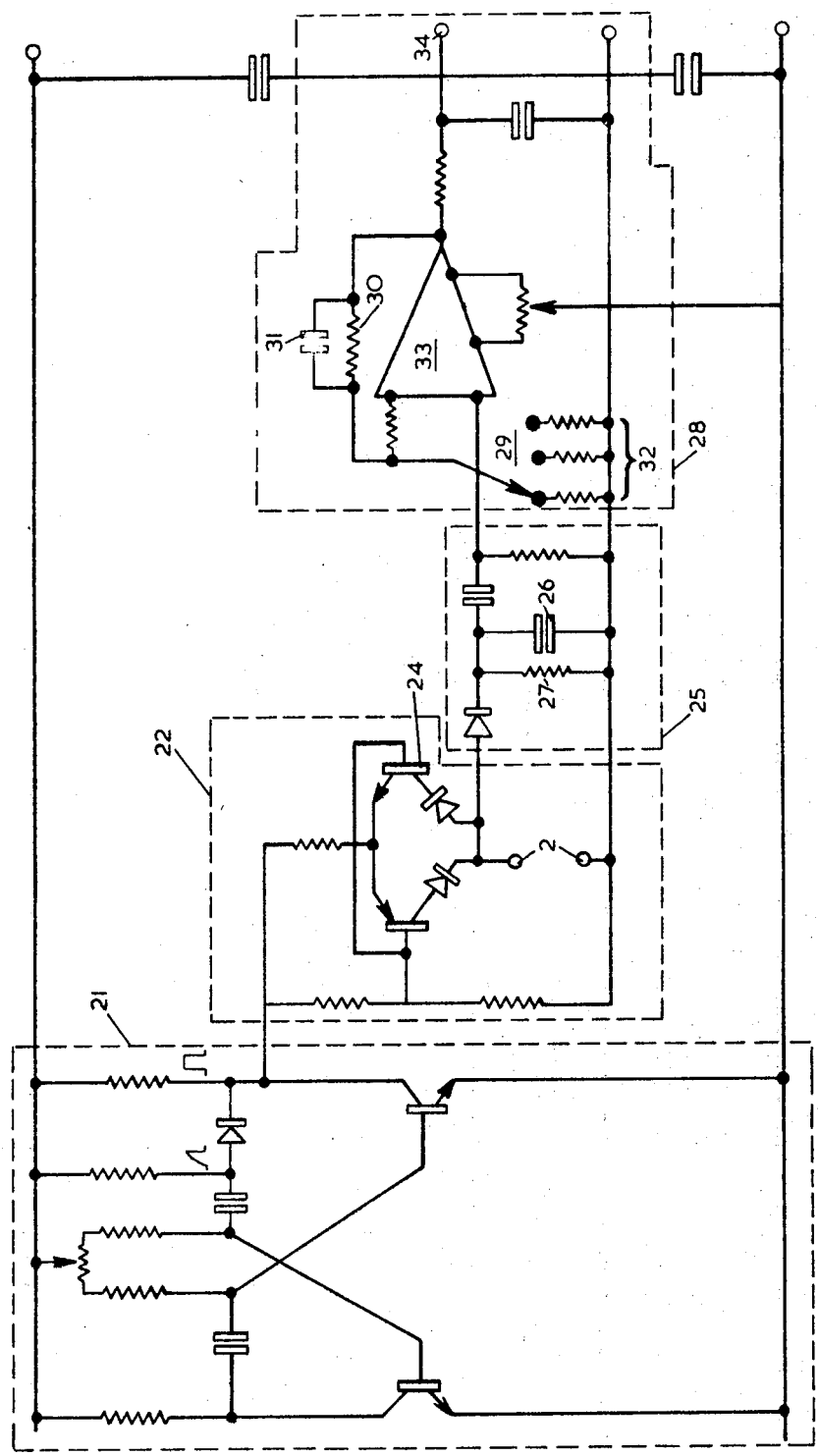
Figure 7:
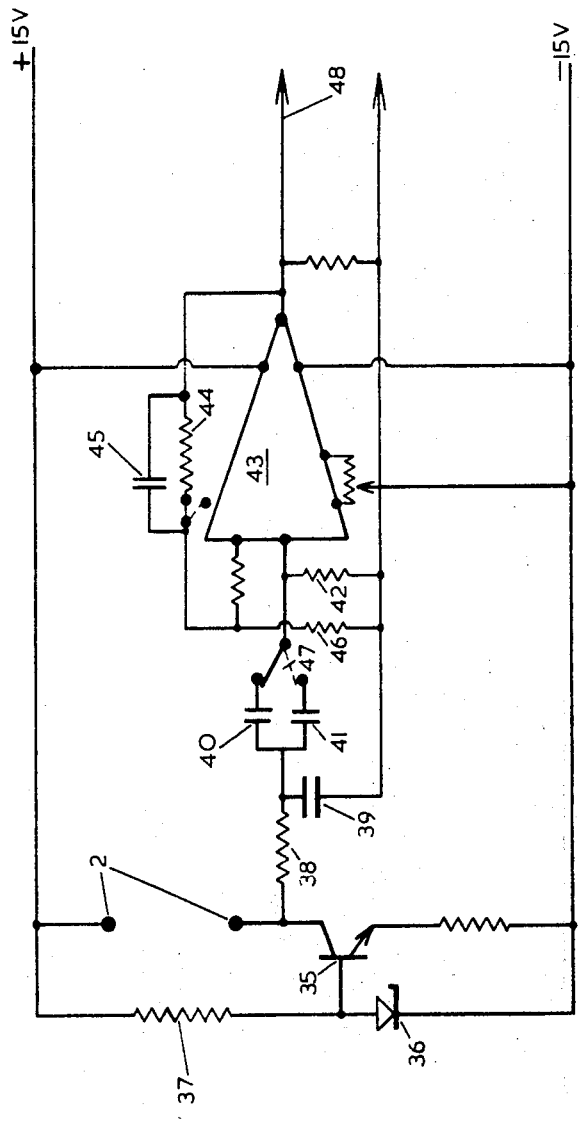

Embodiments of the invention will now be described, by way of example, with reference to the accompanying drawings, in which:

FIG. 1 is a schematic diagram of apparatus for measuring mass flow of a discontinuous phase in a multiphase flow conveying system, in accordance with the invention, FIG. 2 is an equivalent circuit diagram of the apparatus shown in FIG. 1, FIG. 3 is a schematic diagram of apparatus for measuring volumetric flow in a liquid or mixture conveying system, in accordance with the invention, FIG. 4 shows typical graphs of the outputs of the electrodes, FIG. 5 is a graph of a typical cross correlation function, FIG. 6 is a circuit diagram of apparatus for detecting conductivity changes, and FIG. 7 is a circuit diagram of apparatus to supply a polarising current and for detecting conductivity changes resulting from the consequent electrolysis.

Referring to FIG. 1, there is shown a flow conveying duct 1 having extending through the wall thereof a pair of electrodes 2 insulated from the duct and from each other. The electrodes 2 are connected to a conductivity transducer 3 which applies a polarising current between the electrodes and senses the voltage between the electrodes due to resistance and its variation resulting from any change of conductivity of the path between the electrodes within the flow stream. The transducer includes a filter which separates the A.C. component from the D.C. component so that the output signal represents only rapid changes in conductivity. The A.C. signal is rectified in rectifier 4 and smoothed in unit 5. The resultant signal is fed to an indicator 6 which is calibrated in terms of mass flow or units from which mass flow can be derived.

An equivalent circuit of the system is shown in FIG. 2. $R_2(f)$ represents the polarisation resistance of the electrodes; it has a frequency dependent argument to represent time variations caused by variations in chemical composition etc. $R_3(f)$ represents the carrier liquid resistance which again varies with chemical composition. $R_4(f)$ represents the change in resistance due to the presence of parcels of differing conductivity material which change has a frequency dependent argument because the spacing of the parcels varies due to turbulence.

The ballast resistor $R_1$ is chosen so that $R_1 >> R_2, R_3, R_4$.

Therefore the current i can be considered constant and $x(f) = i R_2(f) + i R_3(f) + i R_4(f)$ In practice the turbulence band width $R_4(f)$ is wide (typically 0 – 5,000 Hz) compared with the band width of the chemical composition and polarisation $R_2(f)$ and $R_3(f)$, which are typically 0 – 0.01Hz, therefore the bandpass filter $F_1$ is arranged to have a bandwidth of 1 – 1,000 Hz so that the filtered voltage $m(t)$ is only that part of $i R_4(t)$ of the equation above occurring between 1 and 1,000 Hz. Variations in chemical compositions $iR_3(f)$ and polarisation $iR_2(f)$ are rejected by the filter.

i.e. measured voltage $$V = K < m(t) >$$

where $< m(t) >$ denotes the mean value of the rectified voltage and $K$ is a calibration constant.

It will now be shown that the volume flow of the parcels component can be directly calculated from the mean (rectified) value of the A.C. voltage m. The liquid to parcels volume ratio in the pipe is high and the parcels within the field of the electrodes are free to move independently of each other. The general direction of motion of the parcels is to follow the liquid flow along the conveyor, but there is a random perturbation superimposed on the motion due to turbulence of the liquid. This perturbation is the result of a large number of small conductivity changes caused by individual parcels crossing the field of the electrodes. The perturbations probably have a Gaussian distribution because it seems likely that the parcels behaviour obeys the central limit theorem. Assuming the Gaussian noise is approximated by band limited white noise $\phi_x(f)$, the cut-off frequency $fc$ increases in proportion to the number of parcels crossing the electrodes field and consequently to the parcels volume Vs. or $$f_c \propto V_s \qquad (1)$$

The voltage $x(t)$ is proportional to the number of parcels and since the power $\sigma^2$ is always proportional to the square of the voltage i.e.

$$\sigma^2 \propto V_s^2 \quad (2)$$

Now the total power is equal to the integral of the power spectral density $$\sigma^2 = \int_0^\infty \phi_x(f)df \quad (3)$$

and for the band-limited spectrum this gives:

$$\sigma^2 = f_c \, \phi x(f) \quad f < f_c \quad (4)$$

from equations (1) and (4)

$$\sigma^2 \propto V_s \, \phi x(f) \, f < f_c \quad (5)$$

from equations (2) and (5)

$$V_s \propto \phi x(f) \, f < f_c. \quad (6)$$

Refer to FIG. 2, the frequency spectrum $\phi m(f)$ of the output signal $m(t)$ from the filter is $$\phi m(f) = \phi x(f) \, | K_1 G_1(f) |_2 \quad (7)$$

where $K_1 G_1(f)$ is the transfer function of the filter. The filter dynamic response is constant and it is reasonable to assume that the noise spectrum extends well above the upper frequency response.

$$\therefore \int_0^\infty \phi_m(f)df \propto \phi_x(f) \quad (8)$$

from equations (6) and (8)

$$V_s \propto \int_0^\infty \phi_m(f)df \quad (9)$$

Now the integral in equation (9) is equal to the total power or mean square value of the signal $m(t)$ giving $$\langle m^2(t) \rangle = \int_0^\infty \phi_m(f)df \quad (10)$$

where $<m^2(t)>$ is the mean square value of $m(t)$, from (9) and (10)

$$V_s \propto <m^2(t)> \quad (11)$$

and it can be seen that since parcels concentration $C \propto V_s$ $$C \propto <m^2(t)> \quad (12)$$

which shows that the parcels concentration $C$ is proportional to the mean square value of the noise signal $m(t)$.

In practice it is more convenient to measure the mean modulus (at means rectified value) of the signal $m(t)$, rather than to measure the mean square value. The minor result of this change is that the linearity of the meter scale is altered.

In apparatus described above the amplitude of the noise signal $m(t)$ may be used to measure changes in mass flow rate of solids conveyed hydraulically. Solids mass flow rate changes may be estimated using a calibration curve drawn specifically for the same material flowing in a pipe of the same diameter.

a simple detector to show flow failure in hydraulic conveyors as previously discussed follows from the same principles. Flow failure corresponds to zero amplitude of noise signal including the case of the conveyor full of stationary material.

The volumetric flow in a conveying system can be measure by cross correlation techniques.

FIG. 3 shows apparatus for the measurement of volumetric flow and comprises a pair of electrodes 10 at point A and a pair of electrodes 11 at point B, in a conveying duct 12. The electrodes are insulated from the duct and from each other. The electrodes are polarised by a D.C. source 13 and the resultant variations of conductivity current of the respective pairs of electrodes are fed first to low pass filters 14 and then to high pass filters 15 before being fed to a cross correlator 16. Cross correlator 16 comprises an adjustable time delay 17 in the upstream electrode signal path, a multiplier 18 to which both signals are fed, an integrator 19 to receive the output of the multiplier and an indicator 20 coupled to the output of the integrator. The low pass filters 14 are used to eliminate spurious signals from electrical transients in the surroundings and the high pass filters 15 remove the polarisation and slow conductivity changes. With the source 13 at 30 volts a typical electrode voltage obtained was of the order of 10mV peak to peak.

The disturbances in the conductivity due to turbulence travel at essentially the same speed as the fluid and are detected first at point $A$ and then point $B$, and the transit time is derived by cross correlation. Hence velocity = distance between A and B/transit time of disturbance from A to B.
volume flow = volume of pipe between A and B/transit time of disturbance from A to B.

The wave forms of the electrode outputs are shown in FIG. 4; because they are random wave forms the time delay $\tau$ between them cannot be measured directly so a cross correlator must be used to measure this delay. A typical correlation function is shown in FIG. 5. The transit time delay of the slurry is found by multiplying together the output $n(t)$ of the downstream electrode with a time-delayed version of the output of the upstream electrodes $m(t-\beta)$, an adjustable time delay $\beta$ being inserted in the output of the upstream electrodes. The product $m(t-\beta)n(t)$ is then integrated over a period of time $T$ to give its mean value which is called the cross correlation function. When the flow transit time delay $\tau$ and the cross correlation time delay $\beta$ are unequal, the mean value of the product is small. However, when the flow time delay and the cross correlation time delay are equal, the signals $m(t-\beta)$ and $n(t)$ will have the closest possible similarity and the mean product of their value will be large. Hence the time delay of the maximum value of the cross correlation function, shown in FIG. 5, uniquely defines the transit time of the flow from position A to position B. A cross correlator designed for flow measurements feeds the value of this time delay to a simple analogue or digital circuit which calculates the flow of the fluid using the equation given above.

A specific advantage of cross correlation flowmeters is that their calibration is dependent primarily on the volume of the pipe. Calibration of the outputs of the electrodes is not required, since only the time delay between them is used for flow measurement and this delay can be measured absolutely by the cross correlator. Other advantages are that a cross correlation flowmeter is linear so that the average value of pulsating flow is measured, there is little or no obstruction to the flow and the transducers themselves are simple to install and generally require no routine maintenance.

Proprietary cross correlators can be used to calculate the correlation function, although presently available cross correlators are expensive because they are made for general purpose use rather than for more restricted flow measurement application. Alternatively an on-line digital computer may be used, but preferably a lower cost special correlator is used.

FIG. 6 is a circuit diagram of apparatus for detecting conductivity changes whilst avoiding electrolysis of the liquid. The apparatus comprises a multivibrator 21 having a frequency such that changes in polarity are higher than the highest frequency of variation of conductivity due to turbulence which is to be measured. The output pulses of multivibrator 21 are fed to a positive/negative constant current generator 22, the transistors 23 and 24 becoming alternately conductive at the multivibrator frequency so that the polarity of the current between the electrodes 2 changes corresponding to this frequency. The voltage developed across the electrodes 2 is fed to a detector 25 which includes a low pass filter provided by capacitor 26 and resistor 27 to remove the frequency components due to rapid changes in polarity of the current. The low frequency shaped signal then passes to an amplifier and high frequency shaper 28, the gain of which can be adjusted by factors of 1, 4 and 16 by selector switch 29 adjusting the resistance values in the feedback network 30, 31 and 32 of an integrated amplifier 33. The output is taken from terminal 34 and utilised for example as in FIG. 1 or FIG. 3.

FIG. 7 is a circuit diagram of apparatus for supplying a polarising current and for detecting conductivity changes resulting from the consequent electrolysis and formation and distribution due to turbulence of gas bubbles between the members of the electrode pair to which the polarising current is applied. The electrodes 2 are connected in series with a transistor 35 across a voltage supply. The current of transistor 35 is maintained substantially constant by connecting its base to a Zener diode 36 fed via resistor 37. The consequent electrolysis of the liquid is affected by turbulence and flow in the liquid. The resultant voltage variations across the liquid are fed via various filter and shaping components 38, 39, 40, 41 and 42 to an integrating amplifier 43 having customary feedback provided by components 44, 45 and 46. The time constant of the input filter may be selected by switch 47 to include either capacitor 40 or capacitor 41, the value of capacitor 41 being ten times that of capacitor 40. The output of amplifier 43 is taken from terminal 48 and utilised for example as in FIG. 3 for cross correlation with the output of similar apparatus connected to electrodes downstream of the first pair of electrodes.

What is claimed is:

1. A method of on-line measurement of total volume flow of an electrolysable liquid in a conveying system, comprising the steps of passing a constant polarising current between a first pair of electrodes in contact with the liquid in a duct of known cross-sectional area, sensing the passage of random conductivity disturbances in the flow of the liquid between said first pair of electrodes and a second pair of electrodes spaced downstream in said duct from said first pair of electrodes, establishing the transit time of the disturbances by cross-correlation, and deriving a measurement of the volumetric flow from the transit time.

2. Apparatus for on-line measurement of total volume flow of an electrolysable liquid in a conveying system, comprising at least two pairs of sensing electrodes, said pairs being spaced with respect to each other along the line of flow in a duct of known cross-sectional area, means for passing a polarising current between each pair of electrodes, means for detecting variations of conductivity between the members of each pair of electrodes due to varying distribution between said members of gas bubbles generated in the liquid by passage of the polarising current between said members, said varying distributions being due to turbulence in the liquid flow, means for deriving the transit time between pairs of electrodes of a pattern of conductivity by cross-correlation of the outputs of the electrodes, and means for deriving a measurement of volumetric flow from the transit time.

3. Apparatus as claimed in claim 2, wherein the means for providing a polarising current comprises a transistor arranged as a constant current generator by providing a constant bias voltage between base and emitter by means of a Zener diode.

4. A method of establishing the presence or absence of flow of liquid of a magnitude above a pre-selected magnitude, comprising the steps of measuring the electrical conductivity between a pair of electrodes in contact with the flow stream, deriving a signal representative of the variations of conductivity due to turbulent mixing of different phases of flow or the turbulent mixing of an injected phase of flow from the measurement, comparing the magnitude of the derived signal with that of a reference source and operating a two-step device according to whether the derived signal magnitude is less than the reference magnitude or equal to or greater than the reference magnitude.

5. Apparatus for establishing the presence or absence of flow of liquid of a magnitude above a pre-selected magnitude, comprising a pair of electrodes extending into contact with the liquid in a duct, means for measuring the changes of conductivity of the liquid due to turbulent mixing of different phases of flow or the turbulent mixing of an injected phase of flow, means for comparing the magnitude of the output of the measuring means with a reference magnitude and a two-step device operated by the result of the comparison according to whether the measuring means output is less than the reference magnitude or equal to or greater than the reference magnitude.

6. Apparatus as claimed in claim 5, comprising a constant current generator adapted to pass a current between a pair of electrodes, the current alternating in direction of flow at a frequency greater than the highest measured frequency of variation of conductivity.

7. Apparatus as claimed in claim 6, wherein the constant current generator is driven by a multivibrator.

* * * * *